United States Patent [19]

Schnitzius

[11] E Re. 30,663

[45] Reissued Jun. 30, 1981

[54] ELECTRICALLY CONDUCTIVE PNEUMATIC SPRING WITH DOOR ACTUATED SWITCH MEANS

[75] Inventor: Klaus Schnitzius, Rheinbrohl, Fed. Rep. of Germany

[73] Assignee: Stabilus GmbH, Koblenz-Neuendorf, Fed. Rep. of Germany

[21] Appl. No.: 848,346

[22] Filed: Nov. 3, 1977

Related U.S. Patent Documents

Reissue of:

[64] Patent No.: 3,919,509
Issued: Nov. 11, 1975
Appl. No.: 482,645
Filed: Jun. 24, 1974

[30] Foreign Application Priority Data

Jun. 28, 1973 [DE] Fed. Rep. of Germany ..... 2332791

[51] Int. Cl.[3] ..... H01H 3/16; B60L 1/02; F16F 9/18; H01R 41/00

[52] U.S. Cl. ..... 200/52 R; 92/5 R; 188/1 A; 200/61.62; 200/82 D; 219/203; 219/541; 267/65 R; 339/9 R

[58] Field of Search ..... 200/61.45, 61.53, 61.62, 200/61.76, 61.78, 276, 61.44, 34, 82 D, 83 N, 61.86; 339/6 R, 9 R, 10; 267/64 R, 65 R, 113, 120, 124; 340/71, 686 (U.S. only); 219/203, 202, 201, 522, 541, 546, 547; 188/1 A, 282; 92/5 R

[56] References Cited

U.S. PATENT DOCUMENTS

| | | | |
|---|---|---|---|
| 1,003,455 | 9/1911 | Hardwick | 200/84 R |
| 1,208,676 | 12/1916 | Smiley et al. | 200/34 |
| 2,068,043 | 1/1937 | Warnke | 219/119 |
| 2,247,843 | 7/1941 | Kamenarovic | 246/168 |
| 2,492,449 | 12/1949 | Tuller et al. | 200/82 D |
| 2,520,353 | 8/1950 | Yanez et al. | 200/82 D |
| 2,646,477 | 7/1953 | Herterick | 200/61.62 |
| 2,688,733 | 9/1954 | Walter, Jr. | 339/4 |
| 2,710,329 | 6/1955 | Herterick | 200/61.62 |
| 2,881,403 | 4/1959 | Vltavsky | 339/9 E |
| 3,141,936 | 7/1964 | Boyle et al. | 200/276 |
| 3,339,910 | 9/1967 | Jackson | 267/65 R |
| 3,646,512 | 2/1972 | Borgstede | 340/52 R |
| 3,649,786 | 3/1972 | Mauron | 200/61.53 |
| 3,659,268 | 4/1972 | Crawford | 200/61.45 R X |
| 3,792,219 | 2/1974 | Rowley | 200/276 X |
| 3,812,312 | 5/1974 | Andersen et al. | 200/61.53 |
| 3,853,331 | 12/1974 | Jones | 200/61.44 X |
| 3,919,509 | 11/1975 | Schnitzius | 200/61.62 |
| 3,963,227 | 6/1976 | Molders | 267/64 R |

FOREIGN PATENT DOCUMENTS

| | | | |
|---|---|---|---|
| 1259212 | 1/1968 | Fed. Rep. of Germany . | |
| 7142664 | 5/1972 | Fed. Rep. of Germany . | |
| 7304750 | 8/1973 | Fed. Rep. of Germany . | |
| 539498 | 9/1941 | United Kingdom . | |
| 626867 | 7/1949 | United Kingdom . | |
| 996878 | 6/1965 | United Kingdom . | |
| 1046176 | 10/1966 | United Kingdom . | |
| 1089516 | 11/1967 | United Kingdom | 200/83 N |
| 1282568 | 7/1972 | United Kingdom . | |

*Primary Examiner*—James R. Scott
*Attorney, Agent, or Firm*—Brumbaugh, Graves, Donohue & Raymond

[57] ABSTRACT

The pneumatic spring which holds the rear gate of a station wagon in the open position transmits electric current to heating filaments in the window of the rear gate by way of terminals on the piston rod and the cylinder of the spring, the terminals being connected by a contact spring in the cylinder cavity in the closed position of the rear gate.

41 Claims, 4 Drawing Figures

ELECTRICALLY CONDUCTIVE PNEUMATIC SPRING WITH DOOR ACTUATED SWITCH MEANS

Matter enclosed in heavy brackets [ ] appears in the original patent but forms no part of this reissue specification; matter printed in italics indicates the additions made by reissue.

This invention relates to pneumatic springs, and particularly to a pneumatic spring intended to be interposed between objects that need to be connected electrically.

The invention will be described hereinbelow with reference to an application in the field of automotive engineering to which it lends itself advantageously, but other applications will readily come to mind.

An ever increasing number of station wagons are being equipped with windshield wipers for the window in the rear gate, and the resistance elements built into rear windows of passenger cars for preventing condensation of moisture on the inner window surface and for melting snow from the outer window surface are becoming popular in the rear gate windows of station wagons as well. The windshield wipers, and particularly the window heaters, draw fairly heavy current and require correspondingly heavy leads for connecting them to one terminal of the electrical system in the vehicle, the other conductive connection being normally provided by the metallic vehicle body.

Flexible cables have been used for connecting the currentconsuming devices on the rear gate to conductors on the fixed portion of the vehicle body, but are subject to failure in flexure after frequent pivoting movement of the rear gate and are difficult to protect against mechanical damage by loads passing through the rear opening of the body. It has been proposed to transmit current to the rear gate by means of slidably engaged contacts fixedly mounted on the body and the rear gate respectively, but such a contact system is relatively complex and costly if it is to operate reliably.

Pneumatic springs have been used for balancing a portion of the weight of an open rear gate, and it has now been found that such pneumatic springs may readily be modified for reliably transmitting even heavy electric current to the rear gate of a station wagon without significantly increasing the cost of the pneumatic spring.

The pneumatic spring according to this invention has a cylinder member and a piston assembly movable in the direction of the cylinder axis between two end positions, the assembly including a piston in sliding contact with the cylinder member in the cavity of the latter and a piston rod member fixedly fastened to the piston and axially projecting from the cylinder member in sealing engagement with the same. A gas under pressure higher than atmospheric pressure is enclosed in the cavity and impedes axial movement of the piston assembly. Means are provided on respective, oppositely spaced, axially terminal portions of the cylinder member and the piston rod member outside the cylinder cavity for fastening the two members to respective objects. The structure defined so far is conventional.

According to the invention, electrically conductive terminals are mounted on the cylinder member and on the piston rod member outside the cavity, and an electrical conductor in the cavity connects the two terminals in one of the end positions of the piston assembly.

Other features and many of the attending advantages of this invention will readily be appreciated as the same becomes better understood by reference to the following detailed description of preferred embodiments when considered in connection with the appended drawing in which.

Figure 1:
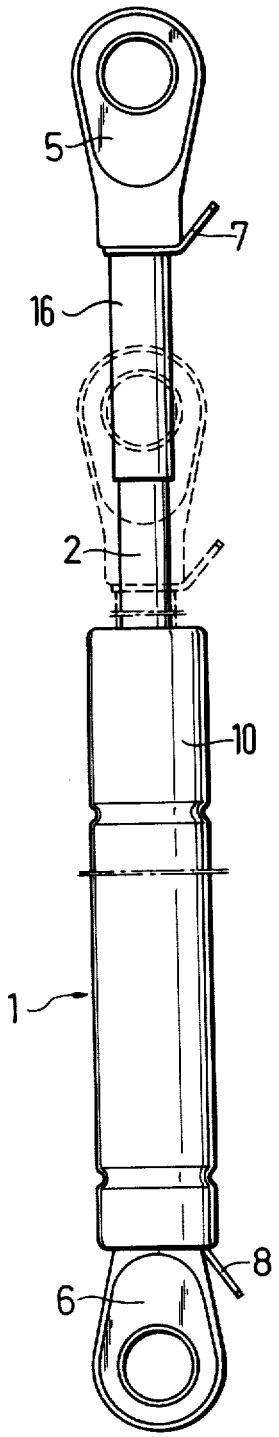
FIG. 1 shows a pneumatic spring of the invention in elevation.

Referring initially to FIG. 1, there is seen a pneumatic spring having an axially elongated cylinder 1 from which a piston rod 2 axially projects. Sturdy eyes 5, 6 on the axially terminal, oppositely spaced portions of the cylinder 1 and the piston rod 2 permit the spring to be fastened between two objects in a conventional manner. A coating or tube 10 of electrically insulating material, such as polyvinyl chloride, covers the entire exposed surface of the cylinder which is visible in FIG. 1. A similar coating or tube 16 covers the portion of the piston rod 2 axially adjacent the eye 5. When the spring is moved from the fully expanded end position illustrated in FIG. 1 in fully drawn lines to the fully contracted end position indicated in broken lines, the coating or tube 16 covers all exposed surfaces of the piston rod 2. Lugs 7, 8 project radially from the eyes 5, 6 where they join the piston rod 2 and the cylinder 1 respectively.

Figure 2:
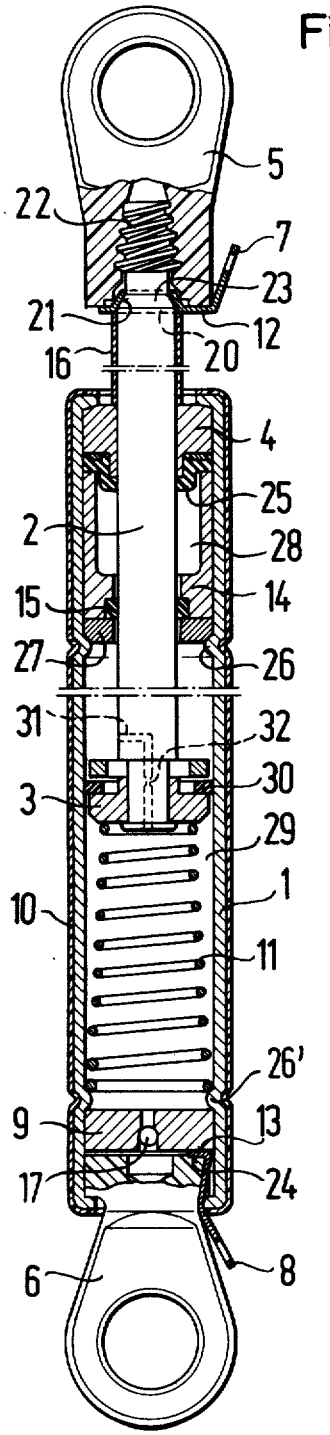
FIG. 2 illustrates the spring of FIG. 1 in axial section.

As is better seen in FIG. 2, the eyes 5, 6 consist of plastic reinforced with glass fibers. An axial bore in the eye 5 is matingly engaged by threads 22 on the metallic piston rod 2, and the piston rod has a conical shoulder 23 adjacent the threads 22. The lug 7 is an integral part of a sheet metal washer 12 formed with an opening 20 and having a conical, raised rim 21 about the opening. The piston rod 2 passes through the opening, and the rim 21 is firmly clamped between the shoulder 23 and a radial end face of the eye 5.

The piston rod 2 axially enters the cavity of the cylinder 1 through an apertured, transverse end wall 4, and is movably sealed to the end wall by a sealing ring 25. The ring 25 is axially secured by a tubular spacer 14 held in its position by a washer 27 which axially abuts against an integral circumferential rib 26 on the inner wall of the cylinder 1. A sealing ring 15 retained by the washer 27 seals the piston rod 2 to the portion of the spacer 14 remote from the sealing ring 25. The sealed annular chamber 28 radially bounded by the rod 2 and the spacer 14, and axially bounded by the sealing rings 15, 25 is filled with oil.

The axial portion 29 of the cylinder cavity between the washer 27 and the other, normally sealed, transverse end wall 9 is filled with nitrogen under a pressure much higher than atmospheric pressure. The reduced end portion of the piston rod 2 in the cylinder cavity is received in the central bore of a fixedly fastened piston 3 carrying a piston ring 30 which provides sliding contact of the piston with the inner cylinder wall. A bore 31 in the end portion of the rod 2 connects the compartments of the cylinder cavity otherwise sealed from each other by the piston 3 and has a throttling portion 32 of reduced flow section.

In the end position of the piston assembly shown in FIG. 2 in which the axial distance between the eyes 5, 6 is at its minimum, the piston 3 abuttingly engages and slightly compresses one axial end of a weak wire spring 11 coiled about the axis of the cylinder 1 in turns which conically decrease in diameter toward the piston 3. The wide end of the spring 11 resiliently engages the inner cylinder wall and is further axially secured by a rib 26' on the cylinder similar to the rib 26. The rib 26' also prevents movement of the end wall 9 axially inward of the cylinder 1 under the resilient pressure exerted by the contiguously adjacent base of the eye 6 which is retained between the end wall 9 and an internal flange of the cylinder 1. A ball 17 in the end wall 9 is pressed into a bore through which the pressure medium has been filled into cylinder 1.

The lug 8 in the exposed end of a metal strip 13 clamped between the eye 6 and the metallic end wall 9 and partly received in a groove 24 of the eye 6. In the illustrated end position of the piston assembly 2, 3, a continuous conductive path capable of carrying relatively heavy current is provided between the lugs 7, 8 by the end wall 9, the cylinder 1, the spring 11, the piston 3, and the piston rod 2. Secondary, less reliable circuits lead from the cylinder 1 to the piston 3 through the piston ring 30, and from the cylinder 1 to the piston rod 2 through the end wall 4. These secondary circuits provide the only conductive connection between the lugs 7, 8 when the piston assembly moves into its other end position in which the piston 3 is nearer the washer 27 than is shown in FIG. 2 while the spring 11 is held in the illustrated position by frictional engagement of its wider end with the cylinder 1 and is separated from the piston 3 by a gas-filled gap. This is not normally undesirable in the application of the pneumatic spring shown in FIG. 3.

Figure 3:
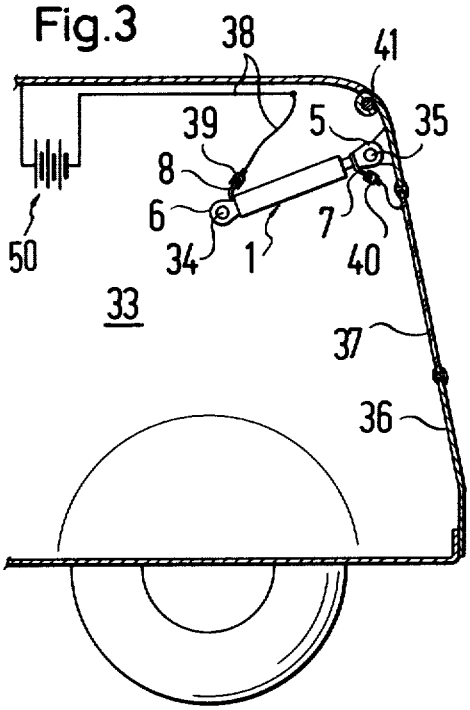
FIG. 3 shows a station wagon equipped with the spring illustrated in FIGS. 1 and 2 in fragmentary, side-elevational section.

FIG. 3 shows only as much of an otherwise conventional station wagon as is relevant to this invention. The body 33 of the vehicle carries a pin 34 which is pivotally received in the eye 6 on the cylinder 1 of the spring shown in FIGS. 1 and 2. Another pin 35 on the rear gate 36 of the wagon is received in the eye 5 of the spring. The window 37 in the rear gate 36 has a fused-in grid of resistance wires drawing current from an insulated supply wire 38 whose illustrated free end carries a clip 39 attached to the lug 8, the other end being connected to one pole of the storage battery 50 and the non-illustrated generator of the wagon in a conventional manner not entirely shown. A clip 40 on one lead of the grid is attached to the lug 7. The grid itself is not capable of pictorial representation on the scale of FIG. 3. Its other lead, not shown, is attached to a metal part of the rear gate 36 and thereby connects the grid to the other pole of the battery 50 and the non-illustrated generator through a return circuit which includes the hinge 41 fastening the gate 36 to the body 33, and the body itself.

The relative movements of the lugs 7, 8 and of the associated objects 36, 33 fastened thereto by the eyes 5, 6 and the pins 34, 35 during opening and closing of the gate 36 are minimal so that the wire 38 and the lead of the window grid connected to the clip 40 are subjected to stresses which they can withstand successfully for the full useful life of the vehicle. While these conductors have been shown in FIG. 3 to be exposed for the convenience of illustration, they may be concealed between inner and outer skin layers of the body 33 and of the gate 36 and safely protected against mechanical damage.

The window 37 needs to be heated only when the gate 36 is in the illustrated closed position, and the eyes 5, 6 are closest to each other. As has been described with reference to FIG. 2, the spring 11 provides a circuit of low resistance in this condition, the lugs 7, 8 constituting the terminals of the circuit. It is not necessary that there be a conductive connection between the terminals 7, 8 when the gate 36 is open, and it is actually desirable to prevent the window 37 from being heated in the open gate to avoid exhaustion of the battery and possible injuries to a person accidentally touching the hot window.

Figure 4:
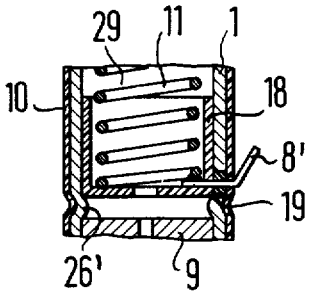
FIG. 4 is a fragmentary view of a modified spring in axial section.

FIG. 4 shows a modification of the pneumatic spring described above which automatically switches off the heating current to the window 37 when the gate 36 is lifted. As far as not shown in FIG. 4, the modified spring is identical with that seen in FIGS. 1 to 3, and it is installed in the station wagon in the same manner.

The modified spring has a cup-shaped receptacle 18 of insulating plastic whose radial end wall axially abuts against the rib 26' of the cylinder 1 and is apertured to admit gas to the cylinder cavity 29. The cylindrical wall of the receptacle 18 conformingly engages the inner cylinder wall and insulates the wider end of the spring 11 from the cylinder. A plastic plug 19 seals a radial bore in the cylinder 1 near the rib 26' and is fixedly fastened to the insulating coating 10 on the outside of the cylinder 1 and to the receptacle 18. The terminal function of the lug 8 is assumed in the modified pneumatic spring by a lug 8' which passes through the plug 19 and is soldered to the wide end of the contact spring 11 in the receptacle 18.

The contact spring 11 provides the only conductive connection between the terminals 7, 8' in the cylinder cavity, and this connection is interrupted when the piston 3 is lifted from the narrow end of the spring 11 while the pneumatic spring expands, as during opening of the gate 36 when the modified spring is installed in the station wagon in the manner shown in FIG. 3.

A pneumatic spring in which all exposed surfaces consist of insulating material at least in the operative condition shown in FIG. 2 avoids accidental short circuits most readily and is preferred. Plastic fastening eyes 5, 6 have sufficient strength for holding a station wagon gate, but may be replaced by plastic-coated metal eyes, if so desired. The necessary electrical insulation of the current-carrying elements of the pneumatic spring from the current-return path in the vehicle body may be brought about in many other obvious ways as by insulating the pins 34, 35 or by placing insulating, tubular liners in the openings of the eyes 5, 6.

Automotive applications of the electrically conductive pneumatic springs of the invention other than the rear gate of a station wagon are found in motor hoods and trunk lids which carry external or internal lights, and applications outside the automotive field will suggest themselves to those skilled in the art.

It should be understood, therefore, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

I claim:

1. A pneumatic spring comprising:

(a) a cylinder member having an axis and formed with a cavity;

(b) a piston assembly axially movable relative to said cylinder member between two end [postions] *positions,* said assembly including (1) a piston axially separating two compartments in said cavity, and (2) a piston rod member fixedly fastened to said piston and axially projecting from said cavity in sealing engagement with said cylinder member;

(c) a body of gas in said cavity and impeding axial movement of said piston assembly;

(d) fastening means on respective, oppositely spaced, axially terminal portions of said cylinder member and of said piston rod member outside said cavity for fastening said members to respective objects and including insulating means for electrically insulating said members from the respective fastened objects;

(e) respective electrically conductive terminals mounted on said cylinder member and on said piston rod member outside said cavity; and (f) electrically conductive means in said cavity conductively connecting said terminals in one of said end positions of said piston assembly.

2. A pneumatic spring as set forth in claim 1, wherein said fastening means include respective fastening eyes of electrically insulating material.

3. A pneumatic spring as set forth in claim 1, wherein said cylinder member and said piston rod member have respective metallic portions, said fastening means each include an element of insulating material, and said terminals are secured under clamping pressure between respective ones of said metallic portions and of said elements, at least one of said terminals projecting radially beyond the associated member.

4. A pneumatic spring as set forth in claim 1, further comprising a coating of electrically insulating material covering substantially the entire surface of said cylinder member exposed outside said cavity.

5. A pneumatic spring as set forth in claim 1, further comprising a tubular body of electrically insulating material covering the portion of said piston rod member projecting from said cavity in each of said end positions.

6. A pneumatic spring as set forth in claim 1, wherein said conductive means include a resilient contact element in said cavity.

7. A pneumatic spring as set forth in claim 6, wherein said contact element is a substantially helical spring fastened to one of said members in said cavity.

8. A pneumatic spring as set forth in claim 1, further comprising switch means in said cavity for interrupting the electrically conductive connection of said terminals by said electrically conductive means in response to movement of said piston assembly into the other one of said end positions thereof.

9. A pneumatic spring as set forth in claim 8, wherein said conductive means include a resilient contact element in said cavity conductively connected to the one of said terminals mounted on said cylinder member, electrically insulating mounting means securing said contact element and said one terminal to said cylinder member, said piston assembly having an electrically conductive face engaging said contact element in said one end position of the piston assembly while being separated from said contact element by said gas in said other end position of said piston assembly, said contact element and piston assembly jointly constituting said switch means.

10. A pneumatic spring as set forth in claim 1, further comprising a source of electric current having two poles, and circuit means respectively connecting said terminals to said poles.

*11. A pneumatic spring comprising:*

*(a) a cylinder member having an axis and formed with a cavity;*

*(b) a piston assembly axially movable relative to said cylinder member between two positions, said assembly including a rod member axially projecting from said cavity;*

*(c) a body of gas at a pressure higher than atmospheric in said cavity for impeding axial movement of said piston assembly;*

*(d) fastening means on said cylinder member and on said rod member for fastening said members to respective objects;*

*(e) two electrically conductive terminals respectively secured to said cylinder member and to said rod member outside said cavity;*

*(f) two electrically conductive means respectively comprised at least in part by said members for conductively connecting said terminals in one of said positions of said piston assembly;*

*(g) insulating means for insulating said two terminals and said two conductive means from said objects.*

*12. A spring as set forth in claim 11, wherein said insulating means comprises means for insulating said members from the objects fastened thereto by said fastening means.*

*13. A spring as set forth in claim 11, wherein said fastening means include a fastening eye comprised at least in part of electrically insulating material on each of said members.*

*14. A spring as set forth in claim 11, wherein said cylinder member and said piston rod member have respective metallic portions, said fastening means each include an element of insulating material, and each of said terminals is secured under clamping pressure between one of said metallic portions and one of said elements, at least one of said terminals projecting radially outward beyond the associated member.*

*15. A spring as set forth in claim 11, further comprising a coating of electrically insulating material covering substantially the entire surface of said cylinder member exposed outside said cavity.*

*16. A spring as set forth in claim 11, further comprising a tubular body of electrically insulating material covering the portion of said piston rod member projecting from said cavity.*

*17. A spring as set forth in claim 11, wherein at least one of said conductive means includes a resilient contact element in said cavity.*

*18. A spring as set forth in claim 17, wherein said contact element is a helical spring fastened to one of said members in said cavity.*

*19. A spring as set forth in claim 11, further comprising switch means in said cavity for interrupting the electrically conductive connection of said terminals by said electrically conductive means in response to movement of said piston assembly away from said one position.*

*20. A spring as set forth in claim 11, further comprising a source of electric current having two poles, and circuit means respectively connecting said terminals to said poles.*

*21. A spring as set forth in claim 11, wherein a portion of said piston assembly is fastened to said rod member in said*

*cavity and slidably engages said cylinder member during said axial movement.*

*22. A spring as set forth in claim 11, wherein said fastening means are mounted on respective, axially terminal portions of said cylinder member and of said rod member.*

*23. A spring as set forth in claim 11, wherein said rod member sealingly engages said cylinder member during axial movement of said piston assembly between said positions.*

*24. A spring as set forth in claim 11, wherein said two electrically conductive means include respective parts thereof located in said cavity for establishing said conductive connection between said terminals.*

*25. A pneumatic spring comprising:*

*(a) a cylinder member having an axis and formed with a cavity;*

*(b) a piston assembly axially movable relative to said cylinder member between two positions, said assembly including a rod member axially projecting from said cavity in engagement with said cylinder member;*

*(c) a body of gas at a pressure higher than atmospheric in said cavity for impeding axial movement of said piston assembly;*

*(d) fastening means on said cylinder member and on said rod member for fastening said members to respective objects;*

*(e) two electrically conductive terminals respectively secured to said cylinder member and to said rod member outside said cavity;*

*(f) electrically conductive means located at least in part in said cavity for conductively connecting said terminals; and*

*(g) insulating means for insulating said terminals and said conductive means from said objects.*

*26. A spring as set forth in claim 25, wherein said insulating means comprises means for insulating one of said terminals and one of said conductive means from one of said members, said one terminal and said one conductive means being secured to said one member.*

*27. A spring as set forth in claim 25, wherein said conductive means include a resilient contact element in said cavity conductively connected to the terminal secured to said cylinder member, electrically insulating mounting means securing said contact element and the connected terminal to said cylinder member, and an electrically conductive face on said piston assembly engaging said contact element in said one position of the piston assembly while being spaced from said contact element in said other position of said piston assembly.*

*28. A spring as set forth in claim 25, wherein said cylinder member and said piston assembly have respective electrically conductive portions conductively connected to said terminals, said electrically conductive means in said cavity include a contact member secured to one of said electrically conductive portions and engaging the other electrically conductive portion during at least a part of the movement of said piston assembly between said two positions.*

*29. A spring as set forth in claim 25, wherein said cylinder member and said rod member have respective end portions axially remote from each other, said fastening means and said terminals being mounted on said end portions.*

*30. A pneumatic spring comprising:*

*(a) a cylinder member having an axis and formed with a cavity;*

*(b) a piston assembly axially movable relative to said cylinder member between two positions, said assembly including a rod member axially projecting from said cavity;*

*(c) a body of gas under a pressure higher than atmospheric in said cavity for impeding axial movement of said piston assembly;*

*(d) fastening means on said cylinder member and on said rod member for fastening said members to respective objects;*

*(e) electrically conductive means respectively secured to said members for conductive connection with each other during at least a part of the relative movement of said members; and*

*(f) insulating means for insulating said conductive means from said objects.*

*31. A spring as set forth in claim 30, further comprising a coating of electrically insulating material covering substantially the entire surface of said cylinder member exposed outside said cavity.*

*32. A spring as set forth in claim 30, further comprising a tubular body of electrically insulating material covering the portion of said rod member projecting from said cavity.*

*33. A spring as set forth in claim 30, wherein said conductive means include a resilient contact element in said cavity.*

*34. A spring as set forth in claim 33, wherein said contact element is a helical spring fastened to one of said members.*

*35. A spring as set forth in claim 30, wherein said piston assembly further includes a sliding member fastened to said rod member in said cavity and slidably engaging said cylinder member during axial movement of said piston assembly.*

*36. A spring as set forth in claim 35, wherein said sliding member is a piston.*

*37. A spring as set forth in claim 30, wherein said fastening means are mounted on respective, axially terminal portions of said cylinder member and of said rod member.*

*38. A spring as set forth in claim 29, wherein said rod member movably engages said cylinder member in sealing engagement.*

*39. A spring as set forth in claim 29, wherein said electrically conductive means are secured to said members in said cavity.*

*40. A spring as set forth in claim 30, wherein said circuit means include an electric heater.*

*41. A spring as set forth in claim 30, wherein said insulating means include means for electrically insulating at least one of said members from an object fastened to said one member by the fastening means on said one member.*

* * * * *

UNITED STATES PATENT AND TRADEMARK OFFICE

CERTIFICATE OF CORRECTION

PATENT NO. : RE 30663

DATED : June 30, 1981

INVENTOR(S) : Klaus Schnitzius

It is certified that error appears in the above—identified patent and that said Letters Patent is hereby corrected as shown below:

Col. 3, line 17, "in" should read --is--;

Col. 6, line 25, after "assembly;" insert --and--;

Col. 8, line 48, "claim 29" should read --claim 30--; and

Col. 8, line 51, "claim 29" should read --claim 30--.

Signed and Sealed this

*Twenty-ninth* Day of *December 1981*

[SEAL]

*Attest:*

GERALD J. MOSSINGHOFF

*Attesting Officer*

*Commissioner of Patents and Trademarks*